(12) United States Patent
Sagane et al.

(10) Patent No.: US 11,743,698 B2
(45) Date of Patent: Aug. 29, 2023

(54) VEHICLE COMMUNICATION DEVICE

(71) Applicant: Yazaki Corporation, Tokyo (JP)

(72) Inventors: Naoki Sagane, Shizuoka (JP); Eita Itou, Shizuoka (JP); Ryohei Nishizaki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 173 days.

(21) Appl. No.: 17/222,914

(22) Filed: Apr. 5, 2021

(65) Prior Publication Data

US 2021/0314754 A1 Oct. 7, 2021

(30) Foreign Application Priority Data

Apr. 7, 2020 (JP) .................................. 2020-069065

(51) Int. Cl.
| | |
|---|---|
| *H04W 4/46* | (2018.01) |
| *H04W 4/44* | (2018.01) |
| *H04W 48/08* | (2009.01) |
| *H04W 76/10* | (2018.01) |

(52) U.S. Cl.
CPC .............. *H04W 4/46* (2018.02); *H04W 4/44* (2018.02); *H04W 48/08* (2013.01); *H04W 76/10* (2018.02)

(58) Field of Classification Search
CPC ......... H04W 4/46; H04W 4/44; H04W 48/08; H04W 76/10; H04W 88/04; H04W 48/16; H04W 76/14; H04W 84/005; H04W 84/12

See application file for complete search history.

(56) References Cited

U.S. PATENT DOCUMENTS

| | | | | |
|---|---|---|---|---|
| 2013/0272269 | A1* | 10/2013 | Srivastava | ............ H04W 36/30 370/332 |
| 2015/0189567 | A1* | 7/2015 | Srivastava | ............ H04W 36/30 370/332 |
| 2016/0150451 | A1* | 5/2016 | Barreto De Miranda Sargento .... H04W 36/30 370/332 |
| 2017/0135007 | A1* | 5/2017 | Srivastava | ............ H04W 36/08 |
| 2020/0068455 | A1 | 2/2020 | Badie et al. | |
| 2020/0322032 | A1* | 10/2020 | Xiang | ................... H04L 5/0048 |
| 2021/0116907 | A1* | 4/2021 | Altman | ................... H04W 4/44 |

(Continued)

FOREIGN PATENT DOCUMENTS

JP 6479652 B2 3/2019

*Primary Examiner* — Luat Phung
(74) *Attorney, Agent, or Firm* — KENEALY VAIDYA LLP

(57) ABSTRACT

A vehicle communication device includes a vehicle-to-vehicle communication unit, an information extraction unit, and a Wi-Fi module. The vehicle-to-vehicle communication unit is mounted on an own vehicle and receives AP information required for wireless connection to an access point for communication relay from another vehicle in the vicinity. The information extraction unit extracts, from vehicle-to-vehicle AP information, which is AP information received from the other vehicle in the vicinity by the vehicle-to-vehicle communication unit, connected AP information, which is AP information received from the other vehicle in front in a traveling direction of the own vehicle and AP information of the access point to which the other vehicle in front is being connected. The Wi-Fi module wirelessly connects to the access point based on the connected AP information extracted by the information extraction unit.

2 Claims, 5 Drawing Sheets

(56) References Cited

U.S. PATENT DOCUMENTS

2021/0211851 A1\* 7/2021 Higuchi .................. H04L 67/12
2021/0314754 A1\* 10/2021 Sagane ................... H04W 4/46
2021/0392670 A1\* 12/2021 Li ..................... H04W 72/0453

\* cited by examiner

FIG.3

|  | SSID | PASSWORD | SECURITY METHOD | FRE-QUENCY (ch) | VEHICLE POSITION INFOR-MATION | CON-NECTION INFOR-MATION | |
|---|---|---|---|---|---|---|---|
| OTHER VEHI-CLE | ○○ | ×× | △△ | □□ | ☆☆ | ◇◇ | ~ N (H) |
| OTHER VEHI-CLE | ○○ | ×× | △△ | □□ | ☆☆ | ◇◇ | ~ N |
| OTHER VEHI-CLE | ○○ | ×× | △△ | □□ | ☆☆ | ◇◇ | ~ N |
| . | . | . | . | . | . | . | |
| . | . | . | . | . | . | . | |
| . | . | . | . | . | . | . | |

VEHICLE COMMUNICATION DEVICE

CROSS-REFERENCE TO RELATED APPLICATION(S)

The present application claims priority to and incorporates by reference the entire contents of Japanese Patent Application No. 2020-069065 filed in Japan on Apr. 7, 2020.

BACKGROUND OF THE INVENTION

1. Field of the Invention

The present invention relates to a vehicle communication device.

2. Description of the Related Art

Conventionally, as a vehicle communication device, for example, Japanese Patent No. 6479652 describes a Wi-Fi connection system including an access point device that relays connection to a computer network and a customer terminal that connects to a computer network via the access point device. This Wi-Fi connection system cuts off the connection between the customer terminal and the access point device when the reception strength of the customer terminal is weak, and suppresses the continuation of the state in which the communication quality is deteriorated.

By the way, the Wi-Fi connection system described in Japanese Patent No. 6479652 described above has room for further improvement in that when a customer terminal connects to a new access point device, for example, it connects to an access point device capable of ensuring communication quality.

SUMMARY OF THE INVENTION

Therefore, the present invention has been made in view of the above, and an object of the present invention is to provide a vehicle communication device capable of an appropriate connection to an access point for communication relay.

In order to solve the above mentioned problem and achieve the object, a vehicle communication device according to one aspect of the present invention includes a vehicle-to-vehicle communication unit configured to be mounted on an own vehicle and receive access point information required for wireless connection to an access point for communication relay from another vehicle in a vicinity; an information extraction unit configured to extract, from vehicle-to-vehicle access point information, which is the access point information received from the other vehicle in the vicinity by the vehicle-to-vehicle communication unit, connected access point information that is access point information received from another vehicle in front in a traveling direction of the own vehicle and is access point information of the access point to which the other vehicle in front is being connected; and an access point communication unit configured to wirelessly connects to the access point based on the connected access point information extracted by the information extraction unit.

According to another aspect of the present invention, in the vehicle communication device, it is preferable that the information extraction unit, when there is a plurality of pieces of the connected access point information, extracts strong radio wave access point information of the access point having a highest radio wave strength from the connected access point information, and the access point communication unit wirelessly connects to the access point corresponding to the strong radio wave access point information extracted by the information extraction unit.

According to still another aspect of the present invention, in the vehicle communication device, it is preferable that the vehicle-to-vehicle communication unit performs first processing of receiving the vehicle-to-vehicle access point information from the other vehicle, the access point communication unit, after the first processing, when the connected access point information is included in the vehicle-to-vehicle access point information, wirelessly connects to the access point corresponding to the connected access point information, and when the connected access point information is not included in the vehicle-to-vehicle access point information, performs second processing of receiving received access point information from the access point, and wirelessly connects to the access point corresponding to the received access point information.

According to still another aspect of the present invention, in the vehicle communication device, it is preferable that the access point communication unit performs second processing of receiving received access point information from the access point simultaneously with first processing that is processing of receiving the vehicle-to-vehicle access point information by the vehicle-to-vehicle communication unit, the information extraction unit extracts strong radio wave access point information of the access point having a highest radio wave strength from the received access point information received by the access point communication unit and the connected access point information extracted by itself, and the access point communication unit wirelessly connects to the access point corresponding to the strong radio wave access point information extracted by the information extraction unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating a configuration example of AP information according to an embodiment;

DETAILED DESCRIPTION OF THE PREFERRED EMBODIMENTS

A mode (embodiment) for carrying out the present invention will be described in detail with reference to the drawings. The present invention is not limited to the content described in the embodiment described below. In addition, the components described below include those that can be easily assumed by those skilled in the art and those that are substantially the same. Further, the configurations described below can be combined as appropriate. In addition, various omissions, substitutions or changes of the configuration can be made without departing from the gist of the present invention.

Embodiment

Figure 1:
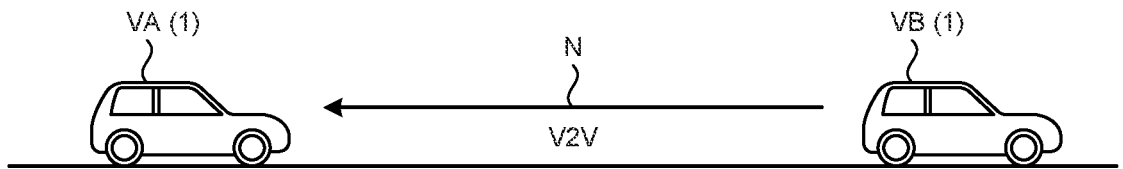
FIG. 1 is a conceptual diagram illustrating a communication example of a vehicle communication device according to an embodiment.
Figure 2:
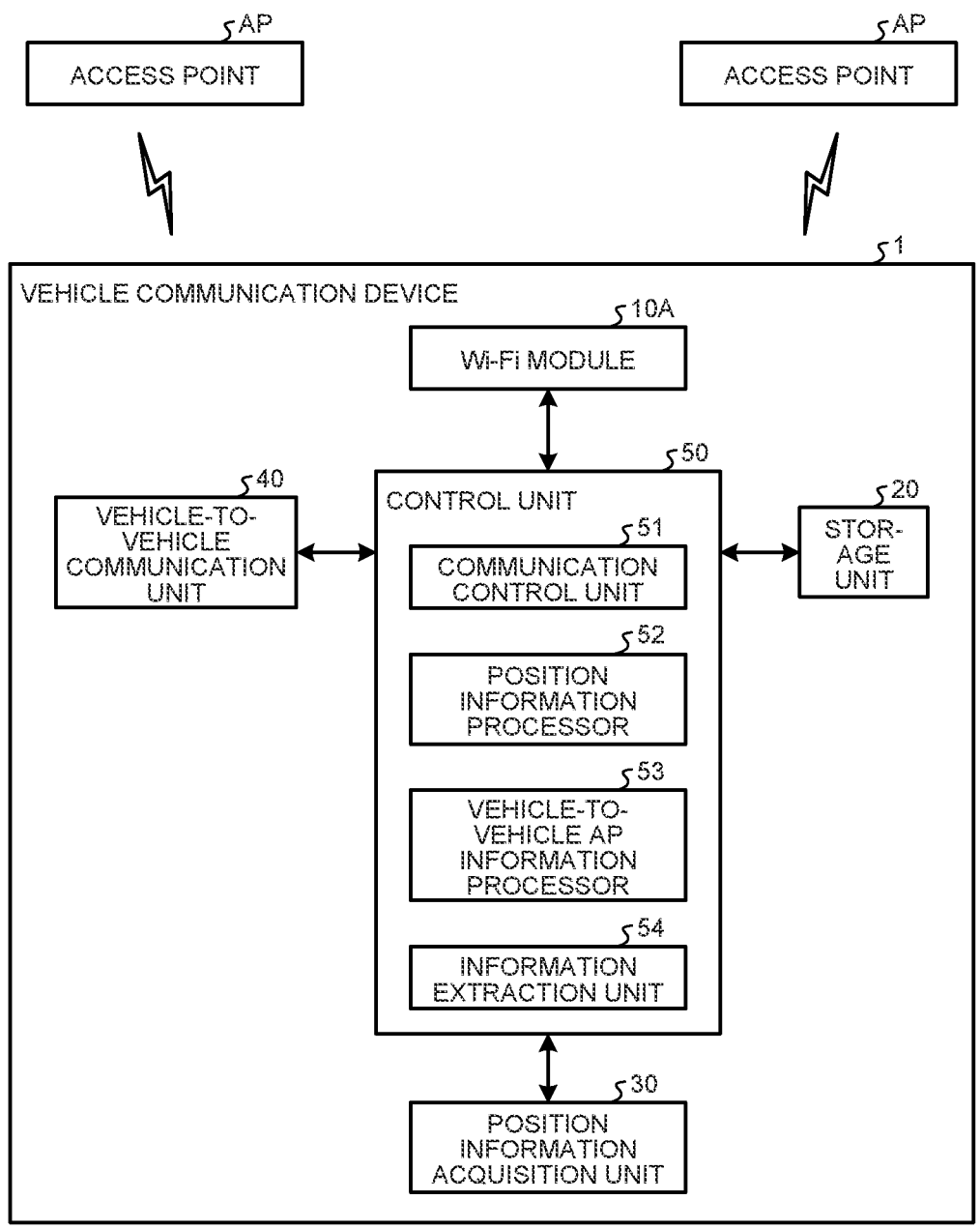
FIG. 2 is a block diagram illustrating a configuration example of a vehicle communication device according to an embodiment.

A vehicle communication device 1 according to the embodiment will be described with reference to the drawings. FIG. 1 is a conceptual diagram illustrating a communication example of the vehicle communication device 1 according to the embodiment. FIG. 2 is a block diagram illustrating a configuration example of the vehicle communication device 1 according to the embodiment. FIG. 3 is a diagram illustrating a configuration example of AP information according to the embodiment.

The vehicle communication device 1 is mounted on a plurality of vehicles, and is wirelessly connected to an access point AP for communication relay based on AP information (access point information) received by vehicle-to-vehicle communication (V2V) between the vehicle communication devices 1 of each vehicle. The vehicle communication device 1 will be described in detail below.

As illustrated in FIG. 1, for example, the vehicle communication device 1 is mounted on an own vehicle VA, another vehicle VB, and other vehicles, which are not illustrated. As illustrated in FIG. 2, the vehicle communication device 1 includes a Wi-Fi (registered trademark) module 10A as an access point communication unit, a storage unit 20, a position information acquisition unit 30, a vehicle-to-vehicle communication unit 40, and a control unit 50, and these functions are mounted in one integrated circuit (IC).

The Wi-Fi module 10A performs wireless communication with the access point AP. The Wi-Fi module 10A complies with the wireless local area network (LAN) standard for transmitting and receiving data via wireless communication. The Wi-Fi module 10A can be connected to the wireless LAN access point AP. Here, the access point AP is a relay base for connecting to an external communication network operated by a communication service provider or the like via the wireless LAN. The access point AP communicates with the Wi-Fi module 10A within a predetermined communication range. That is, the access point AP can communicate with the Wi-Fi module 10A within the communication range, and cannot communicate with the Wi-Fi module 10A outside the communication range.

The Wi-Fi module 10A receives the AP information required for wireless connection to the access point AP from the access point AP. Here, for the AP information, for example, a service set identifier (SSID), a password, a security method, a frequency (ch), and the like are registered for each access point AP. The SSID is an identifier for identifying the access point AP. The password is information for permitting the connection to the access point AP. The security method is a method of encrypting the communication between the Wi-Fi module 10A and the access point AP, and examples thereof include WEP, WPA, and WPA2. The frequency (ch) is a frequency used for communication between the Wi-Fi module 10A and the access point AP. As for the frequency (ch), the same frequency channel is used for communication between the Wi-Fi module 10A and the access point AP. The Wi-Fi module 10A performs authentication or the like based on the AP information and connects to the access point AP to transmit and receive information. The Wi-Fi module 10A is connected to the control unit 50 and outputs the received signal received from the access point AP to the control unit 50. In addition, the Wi-Fi module 10A transmits a transmission signal output from the control unit 50 to the access point AP.

The storage unit 20 is a non-volatile memory that stores various types of information. The storage unit 20 stores conditions, information, various programs, applications, and the like necessary for various types of processing in the control unit 50. The storage unit 20 stores, for example, map information, AP information, and the like. In the storage unit 20, such information is read out as needed by the control unit 50 or the like, and various types of information is written.

The position information acquisition unit 30 acquires vehicle position information indicating the position of a traveling vehicle, and is, for example, a global positioning system (GPS). The position information acquisition unit 30 receives a positioning signal from a satellite at predetermined intervals. Then, the position information acquisition unit 30 measures the current position based on the positioning signal received from the satellite, and generates vehicle position information indicating the measured current position. Here, the vehicle position information is represented by, for example, latitude and longitude. The position information acquisition unit 30 is connected to the control unit 50 and outputs the generated vehicle position information to the control unit 50 at predetermined intervals.

The vehicle-to-vehicle communication unit 40 transmits and receives information to and from a plurality of vehicles on which the vehicle-to-vehicle communication unit 40 is mounted. The vehicle-to-vehicle communication unit 40 performs communication, for example, using radio waves having a frequency in the 700 MHz band and has a communication distance of about several hundred meters (for example, about 300 m). That is, the vehicle-to-vehicle communication unit 40 performs vehicle-to-vehicle communication within the range of a circle having a radius of about several hundred meters (for example, about 300 m). In other words, the own vehicle VA performs vehicle-to-vehicle communication with the other vehicle VB located within this range, and does not perform vehicle-to-vehicle communication with the other vehicle VB located outside the range. The vehicle-to-vehicle communication unit 40 receives vehicle-to-vehicle AP information N (see FIG. 3), which is AP information required for wireless connection to the access point AP, from the other vehicle VB in the vicinity. Here, the vehicle-to-vehicle AP information N includes, for example, as illustrated in FIG. 3, vehicle position information indicating the traveling position of the other vehicle VB and connection information indicating whether it is AP information connected to the access point AP, in addition to the above-mentioned SSID, password, security method, and frequency (ch).

The control unit 50 controls the Wi-Fi module 10A, the position information acquisition unit 30, and the vehicle-to-vehicle communication unit 40. The control unit 50 is configured to include an electronic circuit mainly composed of a well-known microcomputer including a CPU, ROM and RAM constituting a memory, and an interface. The control unit 50 includes a communication control unit 51, a position information processor 52, a vehicle-to-vehicle AP information processor 53, and an information extraction unit 54. The communication control unit 51 controls the Wi-Fi module 10A, connects to an external communication network via the access point AP or the like, and controls communication with the external communication network. The position information processor 52 controls the position information acquisition unit 30 and acquires the vehicle position information from the position information acquisition unit 30. The vehicle-to-vehicle AP information processor 53 controls the vehicle-to-vehicle communication unit 40, and controls information transmitted and received to and from the other vehicle VB.

The information extraction unit 54 extracts appropriate AP information from a plurality of pieces of AP information. The information extraction unit 54 extracts, for example, from the vehicle-to-vehicle AP information N received from the other vehicle VB in the vicinity by the vehicle-to-vehicle communication unit 40, connected AP information H, which is AP information received from the other vehicle VB in front in the traveling direction of the own vehicle VA and AP information of the access point AP to which the other vehicle VB in front is being connected (see FIG. 3). Specifically, the information extraction unit 54 specifies the other vehicle VB located in front in the traveling direction of the own vehicle VA with respect to the position of the own vehicle VA based on the vehicle position information of the other vehicle VB in the vehicle-to-vehicle AP information N and the vehicle position information of the own vehicle VA generated by the position information acquisition unit 30. The specified other vehicle VB in front includes vehicles traveling in the same direction along the traveling direction, vehicles traveling along a crossing direction crossing the traveling direction, vehicles traveling in the opposite direction along the traveling direction (oncoming vehicles), and the like. Here, the traveling direction of the own vehicle VA is calculated by the position information processor 52. The position information processor 52 calculates the traveling direction of the own vehicle VA, for example, based on the traveling position of the own vehicle VA detected by the position information acquisition unit 30 at different times.

The information extraction unit 54 specifies the other vehicle VB located in front in the traveling direction of the own vehicle VA with respect to the position of the own vehicle VA and then extracts the connected AP information H, which is AP information received from the specified other vehicle VB in front and which is of the access point AP to which the other vehicle VB in front is being connected. Here, the connected AP information H is the AP information of the access point AP in which when the other vehicle VB in the vicinity transmits AP information by vehicle-to-vehicle communication, the vehicle communication device 1 of the other vehicle VB connects to the access point AP and the information is actually transmitted and received via the access point AP or the like. The communication control unit 51 wirelessly connects to the access point AP via the Wi-Fi module 10A based on the connected AP information H extracted by the information extraction unit 54.

Figure 4:
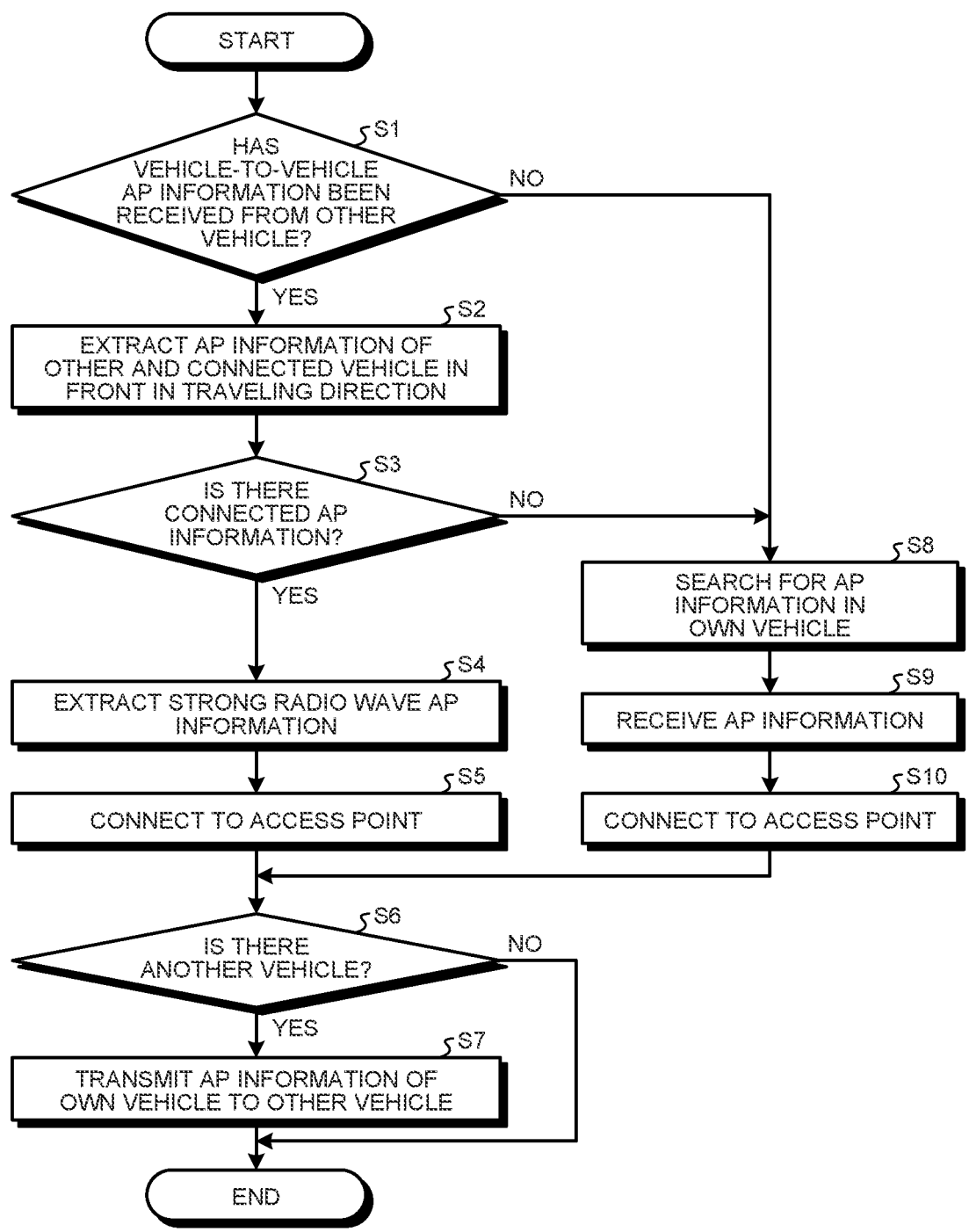
FIG. 4 is a flowchart illustrating a first operation example of a vehicle communication device according to an embodiment.

Next, an operation example of the vehicle communication device 1 will be described. FIG. 4 is a flowchart illustrating a first operation example of the vehicle communication device 1 according to the embodiment. In the vehicle communication device 1, the vehicle-to-vehicle AP information processor 53 performs first processing in which the vehicle-to-vehicle communication unit 40 is controlled to receive the vehicle-to-vehicle AP information N from the other vehicle VB. Then, after the first processing, the vehicle-to-vehicle AP information processor 53 determines whether or not the vehicle-to-vehicle AP information N has been received from the other vehicle VB (Step S1). When the vehicle-to-vehicle AP information N has been received from the other vehicle VB by the vehicle-to-vehicle AP information processor 53 (Step S1; Yes), the information extraction unit 54 extracts the connected AP information H, which is the AP information received from the other vehicle VB in front in the traveling direction of the own vehicle VA and the AP information of the access point AP to which the other vehicle VB in front is being connected (Step S2). Next, the information extraction unit 54 determines whether or not there is the connected AP information H (Step S3). The information extraction unit 54, when there is the connected AP information H (Step S3; Yes), extracts strong radio wave access point information (Step S4). For example, when there is a plurality of pieces of connected AP information H, the information extraction unit 54 extracts the strong radio wave AP information of the access point AP having the highest radio wave strength from the plurality of pieces of connected AP information H. In addition, when there is one piece of connected AP information H, the information extraction unit 54 extracts the one piece of connected AP information H as the strong radio wave AP information having the highest radio wave strength. Here, the radio wave strength of the access point AP is determined based on, for example, a predetermined threshold value. For example, the information extraction unit 54 compares the radio wave strength of the access point AP of the strong radio wave AP information with the threshold value, and when the radio wave strength of the access point AP is equal to or higher than the threshold value, determines that the radio wave strength is high, and when the radio wave strength of the access point AP is less than the threshold value, determines that the radio wave strength is low.

Next, the communication control unit 51 connects to the access point AP by the Wi-Fi module 10A (Step S5). The Wi-Fi module 10A connects to, for example, an access point AP corresponding to the strong radio wave AP information extracted in Step S4 described above. Next, the vehicle-to-vehicle AP information processor 53 determines whether or not there is the other vehicle VB in the vicinity (Step S6). The vehicle-to-vehicle AP information processor 53 determines, for example, whether or not there is the other vehicle VB capable of communication with the vehicle-to-vehicle communication unit 40. When there is the other vehicle VB in the vicinity (Step S6; Yes), the communication control unit 51 transmits the AP information of the own vehicle VA to the other vehicle VB (Step S7). On the other hand, when there is no other vehicle VB in the vicinity (Step S6; No), the communication control unit 51 does not transmit the AP information of the own vehicle VA to the other vehicle VB.

In Step S3 described above, when the vehicle-to-vehicle AP information N received from the other vehicle VB does not include the connected AP information H described above (Step S3; No), the communication control unit 51 searches for AP information in the own vehicle VA (Step S8). For example, the communication control unit 51 performs second processing in which AP information (so-called beacon) is received from the access point AP in the vicinity by the Wi-Fi module 10A (Step S9). Then, the communication control unit 51 connects to the access point AP corresponding to the AP information (received AP information) received by the Wi-Fi module 10A (Step S10). Then, the vehicle-to-vehicle AP information processor 53 proceeds to Step S6 described above and determines whether or not there is the other vehicle VB in the vicinity.

In Step S1 described above, when the vehicle-to-vehicle AP information N is not received from the other vehicle VB by the vehicle-to-vehicle AP information processor 53 (Step S1; No), the communication control unit 51 proceeds to Steps S8, S9, and S10 described above and connects to the access point AP based on the received AP information.

As described above, the vehicle communication device 1 according to the embodiment includes the vehicle-to-vehicle communication unit 40, the information extraction unit 54, and the Wi-Fi module 10A. The vehicle-to-vehicle communication unit 40 is mounted on the own vehicle VA and receives the AP information required for wireless connection to the access point AP for communication relay from the other vehicle VB in the vicinity. The information extraction unit 54 extracts, from the vehicle-to-vehicle AP information N, which is AP information received from the other vehicle VB in the vicinity by the vehicle-to-vehicle communication unit 40, the connected AP information H, which is AP information received from the other vehicle VB in front in the traveling direction of the own vehicle VA and AP information of the access point AP to which the other vehicle VB in front is being connected. The Wi-Fi module 10A wirelessly connects to the access point AP based on the connected AP information H extracted by the information extraction unit 54.

With this configuration, the vehicle communication device 1 can omit the search for the access point AP (acquisition of SSID and radio wave strength) by the Wi-Fi module 10A, and can shorten the connection time to the access point AP. Since the vehicle communication device 1 is mounted on a vehicle having a moving speed faster than that of a pedestrian, it is desired to connect to the access point AP immediately, and there is a great merit that the connection time to the access point AP can be shortened. Since the vehicle communication device 1 connects to the access point AP based on the AP information of the access point AP to which the other vehicle VB in front is being connected, it is possible to connect to the access point AP with more suitable communication quality (stronger radio wave strength). As a result, the vehicle communication device 1 can be appropriately connected to the access point AP.

In the vehicle communication device 1 described above, when there is a plurality of pieces of connected AP information H, the information extraction unit 54 extracts the strong radio wave AP information of the access point AP having the highest radio wave strength from the plurality of pieces of connected AP information H. The Wi-Fi module 10A wirelessly connects to the access point AP corresponding to the strong radio wave AP information extracted by the information extraction unit 54. With this configuration, the vehicle communication device 1 can be connected to the access point AP having better communication quality (stronger radio wave strength), and as a result, can be appropriately connected to the access point AP.

In the vehicle communication device 1 described above, the vehicle-to-vehicle communication unit 40 performs the first processing of receiving the vehicle-to-vehicle AP information N from the other vehicle VB. Then, after the first processing, the Wi-Fi module 10A wirelessly connects to the access point AP corresponding to the connected AP information H when the connected AP information H is included in the vehicle-to-vehicle AP information N. On the other hand, the Wi-Fi module 10A performs the second processing of receiving the received AP information from the access point AP when there is no connected AP information H in the vehicle-to-vehicle AP information N, and wirelessly connects to the access point AP corresponding to the received AP information. With this configuration, the vehicle communication device 1 consecutively processes (sequentially processes) the first processing and the second processing described above, and when the connected AP information H is included in the vehicle-to-vehicle AP information N, the second processing of receiving the received AP information from the access point AP can be omitted, and the processing load can be reduced.

Variation

Next, a variation of the embodiment will be described. Note that in the variation, the same components as those in the embodiment are designated by the same reference numerals, and detailed description thereof will be omitted. In the above description, an example of sequential processing is described in which after the vehicle-to-vehicle AP information N is received (Step S1), when the connected AP information H is not included in the received vehicle-to-vehicle AP information N (Step S3; No), the vehicle communication device 1 searches for AP information in the own vehicle VA (Step S8), but this is by no means limiting. That is, an example of sequential processing is described in which the vehicle communication device 1 consecutively performs the processing of receiving the vehicle-to-vehicle AP information N and the processing of searching for the AP information in the own vehicle VA, but this is by no means limiting. For example, the vehicle communication device 1 may simultaneously perform the processing of receiving the vehicle-to-vehicle AP information N and the processing of searching for the AP information in the own vehicle VA (second operation example below).

Figure 5:
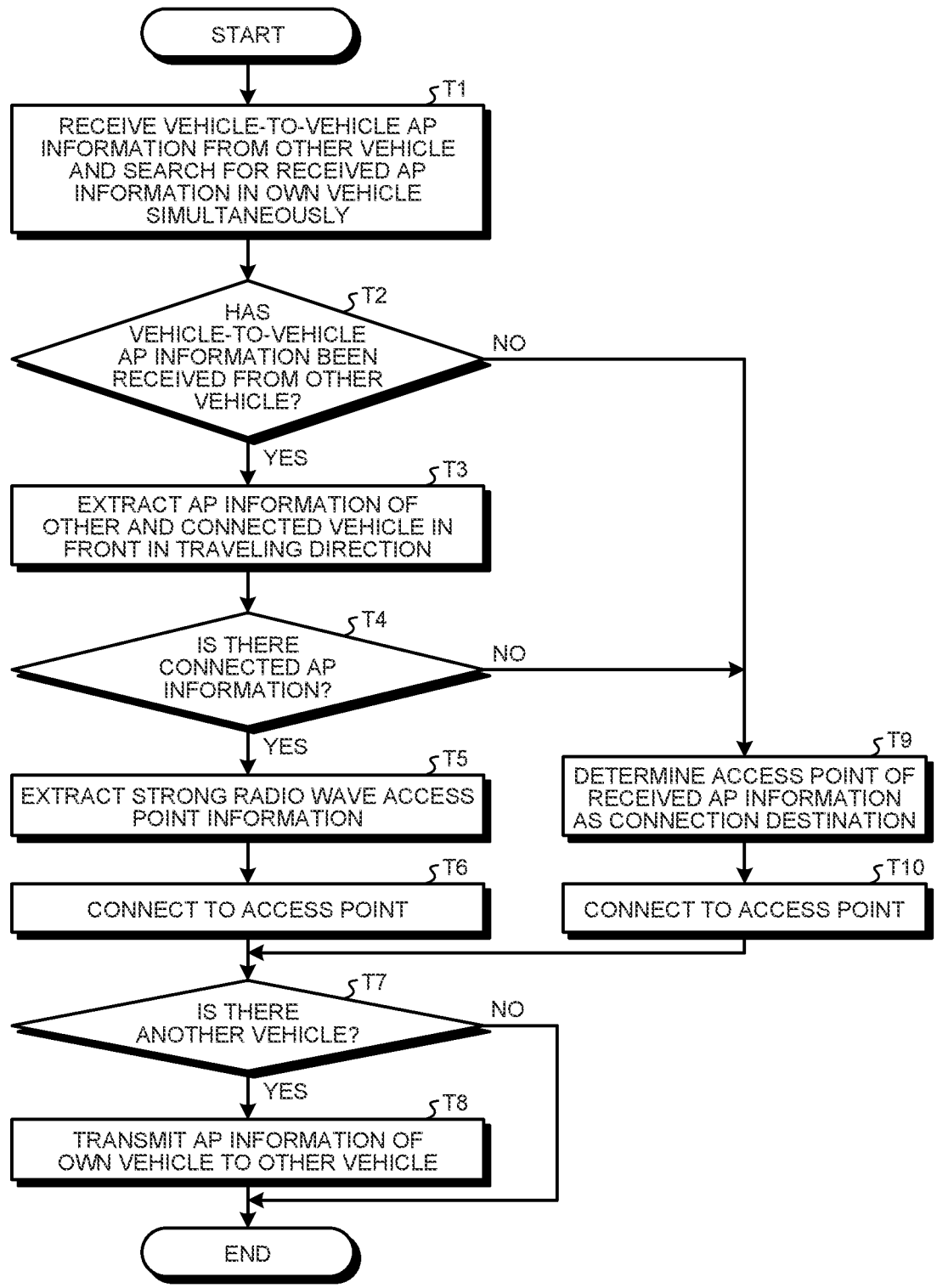
FIG. 5 is a flowchart illustrating a second operation example of a vehicle communication device according to an embodiment.

FIG. 5 is a flowchart illustrating a second operation example of the vehicle communication device 1 according to the embodiment. In this second operation example, as illustrated in FIG. 5, the vehicle communication device 1 receives the vehicle-to-vehicle AP information N from the other vehicle VB by the vehicle-to-vehicle communication unit 40, and simultaneously with the first processing, which is the processing of receiving the vehicle-to-vehicle AP information N by the vehicle-to-vehicle communication unit 40, performs the second processing of searching for the received AP information in the own vehicle VA by the Wi-Fi module 10A (Step T1). Next, the vehicle-to-vehicle AP information processor 53 determines whether or not the vehicle-to-vehicle AP information N has been received from the other vehicle VB (Step T2). When the vehicle-to-vehicle AP information N has been received from the other vehicle VB (Step T2; Yes), the information extraction unit 54 extracts the connected AP information H, which is the AP information received from the other vehicle VB in front in the traveling direction of the own vehicle VA and the AP information of the access point AP to which the other vehicle VB in front is being connected (Step T3). Next, the information extraction unit 54 determines whether or not there is the connected AP information H (Step T4). The information extraction unit 54, when there is the connected AP information H (Step T4; Yes), extracts strong radio wave access point information (Step T5). The information extraction unit 54 extracts, for example, the strong radio wave AP information of the access point AP having the highest radio wave strength from the connected AP information H extracted itself and the received AP information received by the Wi-Fi module 10A. Next, the communication control unit 51 connects to the access point AP corresponding to the strong radio wave AP information extracted by the information extraction unit 54 via the Wi-Fi module 10A (Step T6).

Next, the vehicle-to-vehicle AP information processor 53 determines whether or not there is the other vehicle VB in the vicinity (Step T7). When there is the other vehicle VB in the vicinity (Step T7; Yes), the communication control unit 51 transmits the AP information of the own vehicle VA to the other vehicle VB (Step T8). On the other hand, when there is no other vehicle VB in the vicinity (Step T7; No), the communication control unit 51 does not transmit the AP information of the own vehicle VA to the other vehicle VB. Note that, in Step T4 described above, when there is no connected AP information H (Step T4; No), the information extraction unit 54 determines the access point AP of the AP information (received AP information) received by the Wi-Fi module 10A as a connection destination (Step T9). Then, the communication control unit 51 connects to the access point AP corresponding to the determined connection destination (Step T10). In addition, even when the vehicle-to-vehicle AP information N is not received from the other vehicle VB (Step T2; No) in Step T2 described above, the access point AP of the AP information (received AP information) received by the Wi-Fi module 10A is determined as a connection destination (Step T9), and the communication control unit 51 connects to the access point AP corresponding to the determined connection destination (Step T10).

In this way, in the vehicle communication device 1, the Wi-Fi module 10A simultaneously performs the first processing, which is the processing of receiving the vehicle-to-vehicle AP information N by the vehicle-to-vehicle communication unit 40, and the second processing of receiving the received AP information from the access point AP. The information extraction unit 54 extracts the strong radio wave AP information of the access point AP having the highest radio wave strength from the received AP information received by the Wi-Fi module 10A and the connected AP information H extracted from the vehicle-to-vehicle AP information N. The Wi-Fi module 10A wirelessly connects to the access point AP corresponding to the strong radio wave AP information extracted by the information extraction unit 54. With this configuration, the vehicle communication device 1 can connect to the access point AP having a high radio wave strength based on the AP information including the received AP information received by the Wi-Fi module 10A.

Figure 6:
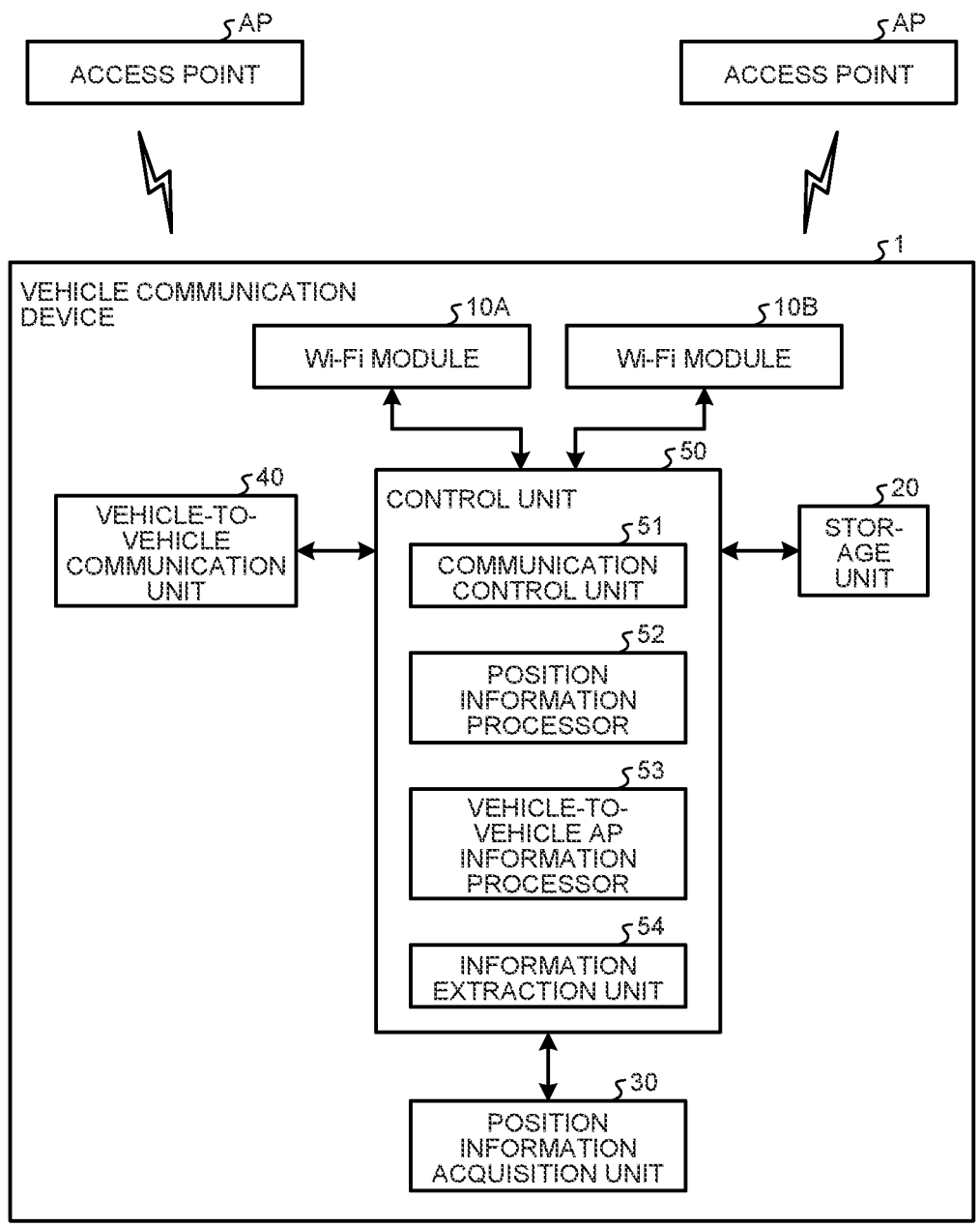
FIG. 6 is a block diagram illustrating a configuration example of a vehicle communication device according to a variation of an embodiment.

In the above description, an example in which the vehicle communication device 1 includes one Wi-Fi module 10A is described, but this is by no means limiting. FIG. 6 is a block diagram illustrating a configuration example of a vehicle communication device 1A according to the variation of the embodiment. The vehicle communication device 1A according to the variation is different from the vehicle communication device 1 according to the embodiment in that the vehicle communication device 1A includes a Wi-Fi module 10B in addition to the Wi-Fi module 10A.

The Wi-Fi module 10B is a communication module having the same communication standard as the Wi-Fi module 10A. The Wi-Fi module 10B complies with the wireless LAN standard and connects to an external communication network via the wireless LAN. The Wi-Fi module 10B can be connected to the wireless LAN access point AP.

The Wi-Fi module 10B receives the AP information required for wireless connection to the access point AP from the access point AP. Then, the Wi-Fi module 10B performs authentication or the like based on the AP information and connects to the access point AP to transmit and receive information. The Wi-Fi module 10B is connected to the control unit 50 and outputs the received signal received from the access point AP to the control unit 50. In addition, the Wi-Fi module 10B transmits a transmission signal output from the control unit 50 to the access point AP.

In this way, the vehicle communication device 1A includes the Wi-Fi module 10A and the Wi-Fi module 10B and thus can search for a next access point AP to connect with the Wi-Fi module 10B while communicating with the external communication network via an access point AP or the like with the Wi-Fi module 10A. That is, while the Wi-Fi module 10A communicates with the external communication network, the vehicle communication device 1A can search for the received AP information in the own vehicle VA with the Wi-Fi module 10B simultaneously with the reception of the vehicle-to-vehicle AP information N by the vehicle-to-vehicle communication unit 40.

In the above description, an example is described in which the Wi-Fi module 10A wirelessly connects to the access point AP corresponding to the strong radio wave AP information of the access point AP having the highest radio wave strength within the connected AP information H, but this is by no means limiting. For example, the Wi-Fi module 10A may wirelessly connect to the access point AP based on other criteria such as the degree of congestion of the access point AP.

In addition, when the Wi-Fi module 10A cannot connect to the access point AP, the vehicle communication device 1 may be connected to a mobile line such as long term evolution (LET) to communicate with the external communication network.

In addition, an example is described in which the vehicle-to-vehicle communication unit 40 performs communication using radio waves having a frequency in the 700 MHz band and the communication distance is about several hundred meters (for example, about 300 m), but this is by no means limiting and communication may be performed using radio waves having other frequencies.

In addition, the vehicle communication device 1 of the own vehicle VA may receive from the vehicle communication device 1 of the other vehicle VB, candidate AP information, which is AP information different from the connected AP information H and is a connection candidate to which the connection is not actually made. In this case, the vehicle communication device 1 of the own vehicle VA determines the AP information to be connected to the access point AP including the candidate AP information.

In addition, an example of the vehicle communication device 1 in which the Wi-Fi module 10A, the storage unit 20, the position information acquisition unit 30, the vehicle-to-vehicle communication unit 40, and the control unit 50 are mounted on one IC has been described, but this is by no means limiting and these functions may be distributed and mounted in a plurality of ICs.

Since the vehicle communication device according to the present embodiment wirelessly connects to an access point based on connected access point information received from another vehicle in front, it can be appropriately connected to the access point.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle communication device comprising:
   a vehicle-to-vehicle communication unit configured to be mounted on an own vehicle and receive access point information from another vehicle in a vicinity, the access point information is required for wireless connection to a first access point for communication relay with an external network, the first access point is separate from the own vehicle and the another vehicle;
   an information extraction unit configured to extract, from vehicle-to-vehicle access point information, which is the access point information received from the another vehicle in the vicinity by the vehicle-to-vehicle communication unit, connected access point information that is access point information received from the another vehicle in front in a traveling direction of the own vehicle and is access point information of the first access point to which the another vehicle in front is being connected; and an access point communication unit configured to wirelessly connect to the first access point based on the connected access point information extracted by the information extraction unit, wherein the access point communication unit performs second processing of receiving received access point information from a second access point simultaneously with first processing that is processing of receiving the vehicle-to-vehicle access point information by the vehicle-to-vehicle communication unit, the second access point is separate from the first access point, the own vehicle, and the another vehicle, the information extraction unit extracts strong radio wave access point information having a highest radio wave strength from the received access point information received by the access point communication unit and the connected access point information extracted by itself, and the access point communication unit wirelessly connects to one of the first access point and the second access point corresponding to the strong radio wave access point information extracted by the information extraction unit.

2. The vehicle communication device according to claim 1, wherein the information extraction unit, when there is a plurality of pieces of the connected access point information, extracts strong radio wave access point information of one of the first access point and the second access point having a highest radio wave strength from the connected access point information, and the access point communication unit wirelessly connects to one of the first access point and the second access point corresponding to the strong radio wave access point information extracted by the information extraction unit.

* * * * *